(12) United States Patent
Galal et al.

(10) Patent No.: US 7,386,890 B2
(45) Date of Patent: Jun. 10, 2008

(54) METHOD AND APPARATUS TO PRESERVE A HASH VALUE OF AN EXECUTABLE MODULE

(75) Inventors: Gehad Galal, Rancho Cordova, CA (US); Randolph Campbell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 10/881,783

(22) Filed: Jun. 30, 2004

(65) Prior Publication Data
US 2006/0059358 A1    Mar. 16, 2006

(51) Int. Cl.
*H04L 9/00* (2006.01)
(52) U.S. Cl. .............................. 726/26; 726/27; 726/30; 713/181
(58) Field of Classification Search ............ 726/26–27, 726/30; 713/181
See application file for complete search history.

(56) References Cited

U.S. PATENT DOCUMENTS

2005/0198051 A1* 9/2005 Marr et al. .................. 707/100
2006/0026569 A1* 2/2006 Oerting et al. .............. 717/126

* cited by examiner

*Primary Examiner*—Hosuk Song
(74) *Attorney, Agent, or Firm*—Blakely, Sokoloff, Taylor & Zafman LLP

(57) ABSTRACT

An executable module includes a dynamic data area that contains all data that may be changed by execution of the executable module. A header in the module includes a start address and an end address for the dynamic data area. The executable module is loaded in a memory. An alternate memory area is allocated in the memory. The dynamic data area is copied to the alternate memory area. The memory is mapped so that execution of the executable module modifies exactly one of the dynamic data area and the alternate memory area. A hash value is computed for the executable module. The hash value includes exactly one of the dynamic data area and the alternate memory area. The unmodified memory area is copied to the modified memory area and the hash value is recomputed to re-establish the executable module in a known state.

30 Claims, 2 Drawing Sheets

METHOD AND APPARATUS TO PRESERVE A HASH VALUE OF AN EXECUTABLE MODULE

BACKGROUND

Computer processing units (CPUs) may read instructions from a memory and read and write data to the memory in response to the instructions. The result of executing an instruction on given data is entirely predictable in the absence of an error in the CPU. However, it is possible that an error will occur in the CPU or that the data or instruction will be erroneously altered when being transferred between the memory and the CPU. Further the results of executing an instruction may depend on the data presented to the instruction. If unexpected data is presented, it is possible that logical errors in the instruction sequence will produce unexpected and undesirable results. In the extreme, the unexpected data could alter the instructions as stored in memory leading to severely compromised results from the execution of an instruction sequence, particularly if the unexpected data is maliciously introduced.

A computer system, which may include one or more CPUs coupled to one or more memories of various types, may load executable modules into the memory. The executable modules may contain executable instruction sequences, code, and data. The CPU may be instructed to execute the code using the provided data.

In an effort to reduce the susceptibility to unexpected and undesired results from the execution of instruction sequences in an executable module, the executable module may be tested to determine if it is as expected before the CPU is instructed to use the executable module. If the executable module as seen by the CPU does not exactly match what is expected, the results of executing the module become unpredictable. The contents of the executable module may be checked by computing a hash value.

A hash value is a value obtained by combining the contents of the executable module according to a defined logical procedure known as a hash function. The hash function is designed so that the value is highly unique to the contents of the executable module and extremely sensitive to any change in the contents. Further, the hash value may be such that it is extremely difficult to deliberately create content to produce a specific hash value. Thus if the executable module produces the expected hash value, it can be assumed that the module has the expected content with an extremely high degree of confidence.

It may be desirable to re-establish that the executable module is the expected module in a condition that can be executed to predictably produce the expected results. This may be accomplished by recomputing the hash value and checking the hash value obtained against the expected hash value.

If an expected hash value for the executable module was not available when the module was initially loaded, a hash value may be computed and saved at load time. The load time hash value may be used to re-establish the executable module as being in the same condition as on the initial load.

The executable module may contain data that is altered by the expected execution of the instructions. These expected alterations will change the hash value and lead to the determination that the executable module is not in the condition where execution of the module is known to produce the expected and desired results. Thus it may be necessary to reload the executable module to re-establish the condition where execution of the module is known to produce the expected and desired results.

Hashing a loaded executable module image may be part of establishing a trusted execution environment. Changed data within the module image in memory means that any hashing function applied to the module before execution will not have the same result if applied after the module starts executing. This means that in order to re-establish a trusted environment, the module may need to be reloaded from flash memory or disk. The reload processor can be slow and disruptive to other system operations. For example, reloading the image may require execution of an SMI (System Management Interrupt). This may block other system interrupts while the image is loaded and hashed by the SMI handler code.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
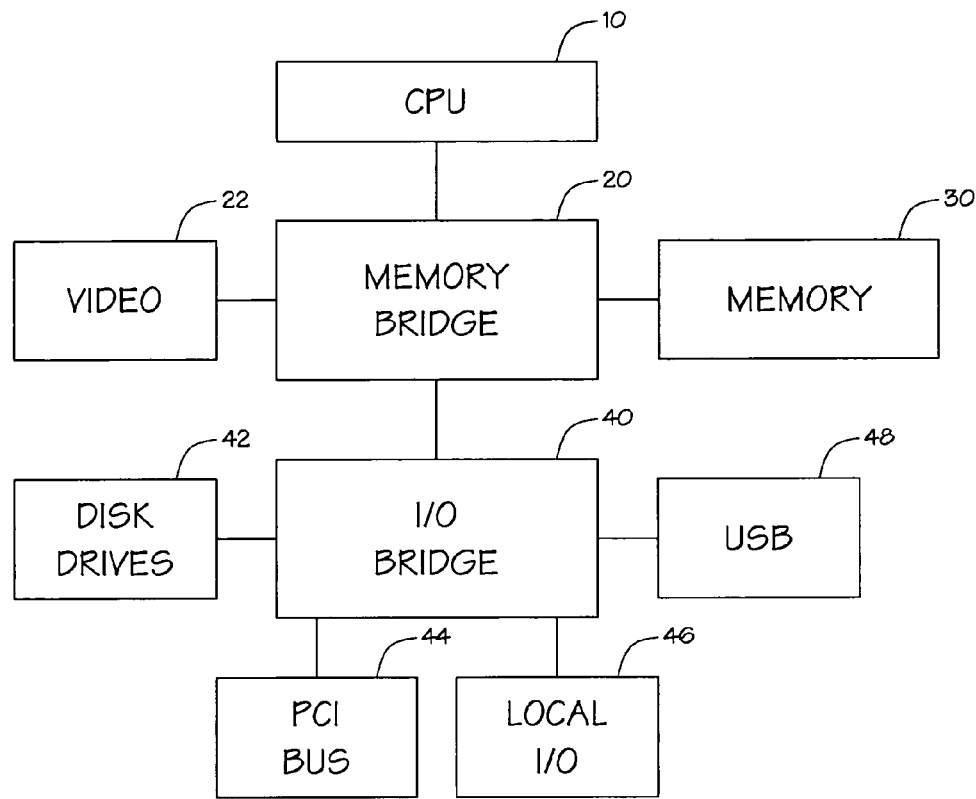
FIG. 1 is a block diagram of a computer system that embodies the invention.

As shown in FIG. 1, a computer system may include a central processing unit (CPU) 10, also referred to as a processor, coupled to a random access memory (RAM) 30. A memory bridge 20 may couple the processor 10 to the memory 30. The RAM may be any of a variety of types of memory such as synchronous dynamic random access memory (SDRAM), RAMBUS® dynamic random access memory (RDRAM), or extended data out random access memory (EDO RAM).

The computer system may include a number of devices that are coupled to the processor 10. A video device 22 may provide a visual display that may receive data from the processor 10 through the memory bridge 20. The memory bridge may also be coupled to an I/O bridge 40. The I/O bridge may be coupled in turn to various devices such as disk drives 42, a Peripheral Component Interconnect (PCI) bus 44 that support various expansion cards, local I/O devices 46 such as timers and power control devices, and Universal Serial Bus (USB) 48 connectors.

The RAM 30 may be loaded with data that represents executable instructions that may be executed by the processor 10. It will be understood that the amount of RAM 30 accessible by the processor 10 may exceed the amount of RAM that is physically present in the computer system. Various memory management techniques may be used to manipulate the contents of the physical RAM 30 so that it appears to the processor 10 that all of the accessible RAM is present. The contents of the RAM 30 will be described as though all accessible RAM is physically present to avoid obscuring the operation of the described embodiments of the invention but it should be understood that the structures described as being in memory may not all be in physical memory concurrently and that different memory structures may occupy the same physical memory successively while remaining logically distinct.

Figure 2:
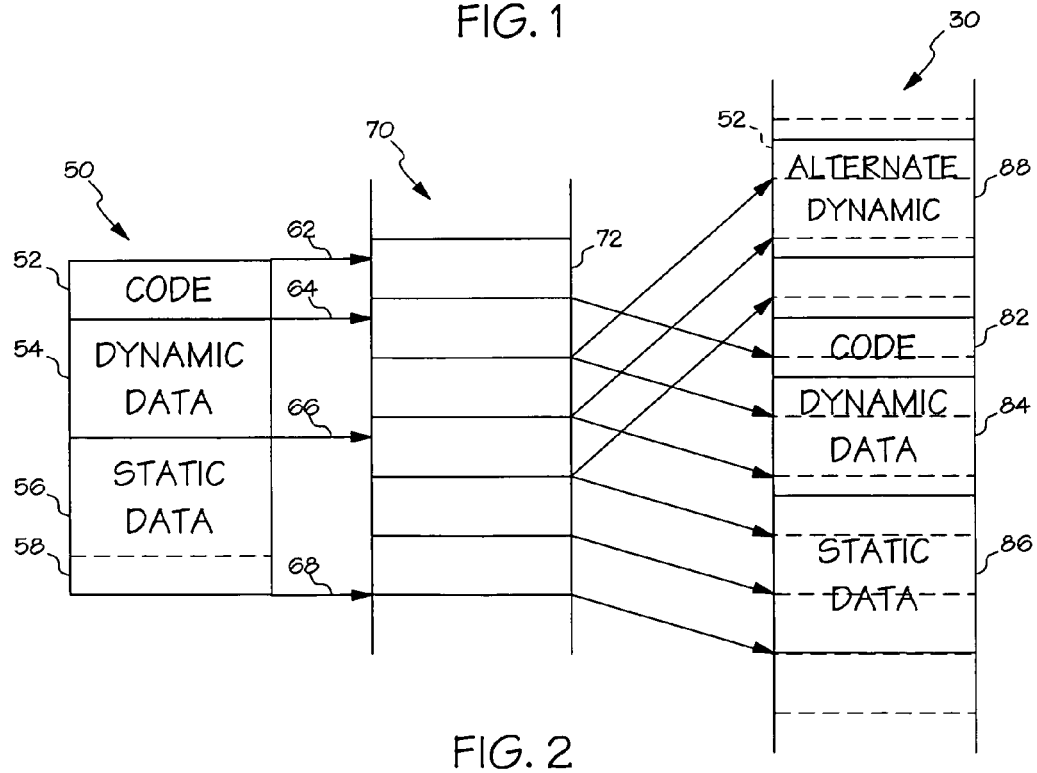
FIG. 2 is an exemplary memory mapping of an executable module to the memory of the computer system of FIG. 1.

FIG. 2 shows an exemplary executable module 50 that may be loaded in the memory 30 for execution by the CPU 10. The executable module 50 may include a code area 52, a dynamic data area 54, and a static data area 56. The code area 52 contains the instructions that may be executed by the CPU 10. It may be required that the instructions not be changed during execution. The static data area 56 contains data to be used during execution of the instructions that does not change during execution. The dynamic data area 54 contains data to be used during execution of the instructions that may change during execution. Thus only the dynamic data area 54 portion of the executable module 50 may change during execution. The code area 52 and the static data area 56 will remain unchanged during execution.

The memory 30 may be managed using a page translation method. The CPU 10 may see a virtual memory space 70 that may be of a different size and arrangement than the underlying physical memory 30. The virtual memory 70 may be arranged conceptually as a series of pages 72. Page translation hardware (not shown) may translate a memory address issued by the CPU 10 that points to a virtual memory address into a physical memory address. The memory locations that are consecutive within a virtual memory page 72 will also be consecutive within a corresponding physical memory page 32. Any virtual memory page 72 may be mapped to any physical memory page 32. Consecutive virtual memory pages 72 are not necessarily mapped to physical memory pages 32 that are consecutive, contiguous, or in the same order in physical memory 30 as in the virtual memory 70.

The arrows connecting the virtual memory pages 72 to the physical memory pages 32 in FIG. 2 are intended to suggest the page mapping process. The page mapping has been shown with the virtual memory pages 72 mapped to physical memory pages 32 that are consecutive, contiguous, and in the same order to simplify the drawing and more clearly show other aspects of the portion of the embodiment illustrated. Thus the executable module 50 will be loaded into physical memory 30 with a mapping such that the loaded static data area 86, dynamic data area 84, and code area 82 appear in the virtual memory space 70 in the proper positions for execution.

The executable module 50 may begin with the static data area 56 as shown in FIG. 2. The first address 68 in the executable module 50 may be loaded into a first address of a virtual page 72 in the virtual memory 70. Loading of the executable module 50 may continue into consecutive locations in the virtual memory 70 through the last memory location 62 of the executable module. The dynamic data area 54 will be loaded into one or more virtual pages 72.

The executable module 50 may include a header 58 that includes a start address 66 and an end address 64 for the dynamic data area 54. The header 58 may be part of the static data area 56. The start address 66 may be in the form of an offset from the first address 68 in the executable module 50. The end address 64 may be in the form of an offset from the first address 68 in the executable module 50 or in the form of an offset from the first address 66 in the dynamic data area 54, which may also be referred to as the size of the dynamic data area. The location of the dynamic data area 54 as loaded in the virtual memory 70 may be determined using the start address 66 and the end address 64 as provided in the header 58. The number of virtual pages 72 occupied by the dynamic data area 54 may thus be determined.

An alternate memory area 88 may be allocated in the physical memory 30. The alternate memory area 88 will contain the same number of pages 32 as are occupied by the dynamic data area 54. The dynamic data area is copied to the alternate memory area. It will be appreciated that both the dynamic data area 54 and the alternate memory area 88 will be mapped as separately available memory areas to the process that performs the copy operation.

The virtual memory 70 is then mapped so that execution of the executable module 50 modifies exactly one of the dynamic data area 84 and the alternate memory area 88 in the physical memory. The page mapping may be configured such that the CPU 10 may access only one of the dynamic data area 84 and the alternate memory area 88 when the executable module 50 is being executed. Thus one of the two areas is left unchanged by the execution. Further, the mapping of the memory may make all of the memory unwritable except for the one of the dynamic data area and the alternate memory area that is accessible. Thus it can be assured that only the pages containing the dynamic data are modified during execution.

A hash value may be computed for the executable module 50. The hash value will include exactly one of the dynamic data area 84 and the alternate memory area 88. The computed hash value may be compared to a hash value computed when the module was built to verify that the module as loaded for execution is identical to the module as built. The start address 66 and the end address 64 for the dynamic data area 54 may be inserted in the executable module 50 when the module is built and before the hash value is computed.

If it is desired to re-verify the integrity of the executable module 50 after a period of execution, the memory area that is not modified by execution may be copied to the area that was made available to the CPU 10 for modification during execution of the executable module. The hash value for the executable module 50 may then be recomputed and compared either to the hash value computed when the module was built or the hash value previously computed.

The start address 66 and the end address 64 for the dynamic data area 54 may coincide with page boundaries for the mapping of the memory. However, at least one of the start address and the end address may not coincide with page boundaries for the mapping of the memory as shown in FIG. 2. If the dynamic data area 54 is not aligned to the memory pages, then the mapping of the memory is of a page-aligned area that includes all of the dynamic data area. That is, all the virtual memory pages 72 that include a portion of the dynamic data area 54 will be copied to corresponding pages in the alternate memory area 88.

Figure 3:
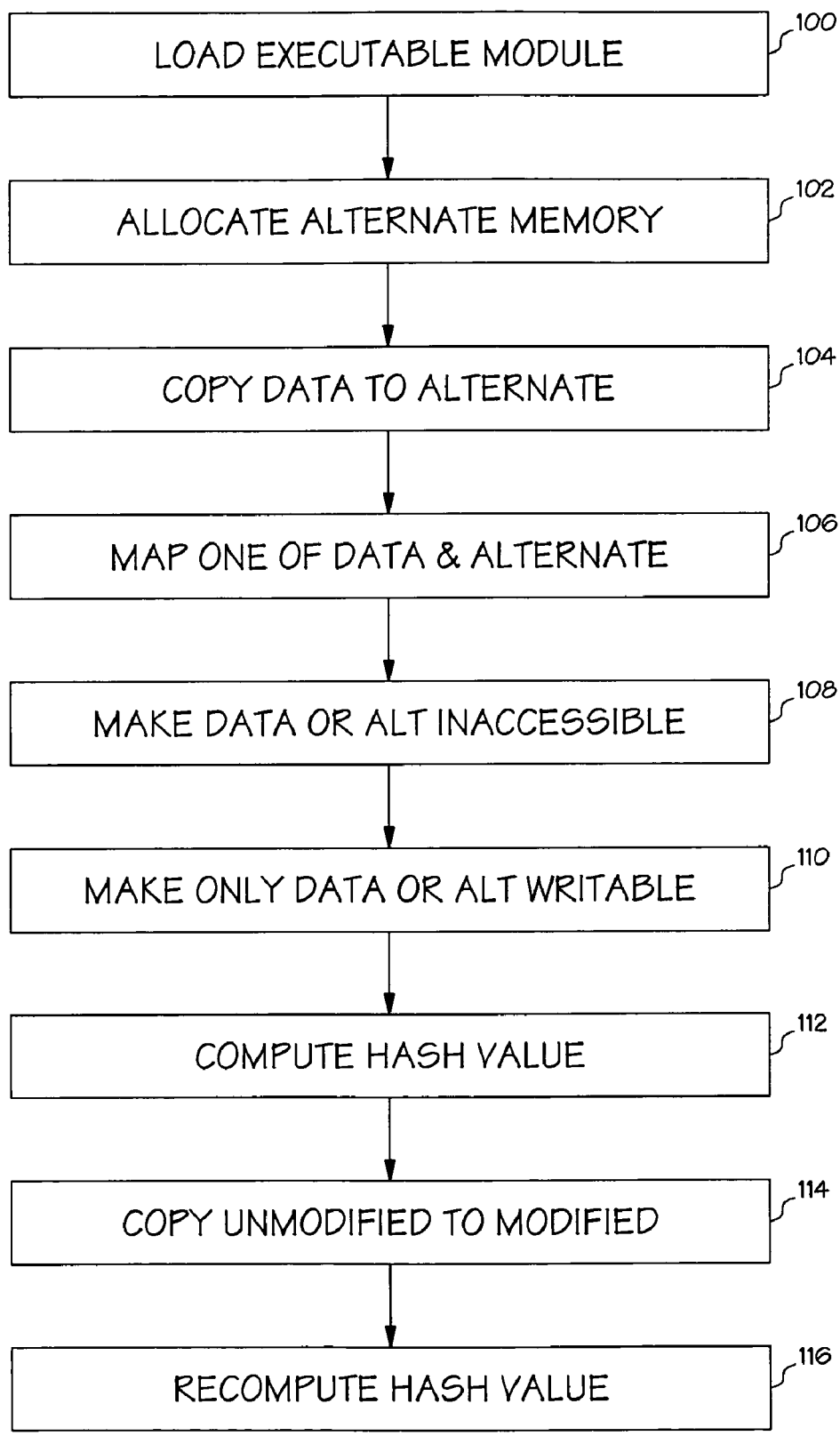
FIG. 3 is a flow chart of an exemplary method for preserving a hash value of the executable module of FIG. 2.

FIG. 3 is a flowchart of an exemplary method to preserve hash value of executable module. The method may include:

loading 100 an executable module 50 having a dynamic data area 54 that contains all data that may be changed by execution of the executable module and a header 58 that includes a start address 66 and an end address 64 for the dynamic data area;

allocating 102 an alternate memory area 88 in a memory 30;

making a copy 104 of the dynamic data area in the alternate memory area;

mapping the memory so that execution of the executable module modifies exactly one of the dynamic data area and the alternate memory area 106;

mapping the memory so that the one of the dynamic data area and the alternate memory area that is not modified by execution of the executable module is inaccessible to the executable module 108;

mapping of the memory so that the memory is unwritable except for the one of the dynamic data area and the alternate memory area that is accessible 110;

computing a hash value for the executable module 112, the hash value including exactly one of the dynamic data area and the alternate memory area;

copying the one of the dynamic data area and the alternate memory area that is not modified by execution of the executable module to the one of the dynamic data area and the alternate memory area that is modified by execution of the executable module 114; and recomputing the hash value for the executable module 116.

It will be appreciated that embodiments of the invention may be in the form of an article of manufacture that includes a machine-accessible medium. The machine-accessible medium may include data that, when accessed by a processor 10, cause the processor to perform operations. Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.).

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   loading an executable module having a dynamic data area that contains data that may be changed by execution of the executable module and a header that includes a start address and an end address for the dynamic data area;
   allocating an alternate memory area in a memory;
   making a copy of the dynamic data area in the alternate memory area;
   mapping the memory so that execution of the executable module modifies exactly one area selected from the group consisting of the dynamic data area and the alternate memory area, and so that the one of the dynamic data area and the alternate memory area that is not modified by execution of the executable module is made inaccessible to the executable module; and
   computing a hash value for the executable module, the hash value including exactly one of the dynamic data area and the alternate memory area.

2. The method of claim 1, further comprising:
   copying the one of the dynamic data area and the alternate memory area that is not modified by execution of the executable module to the one of the dynamic data area and the alternate memory area that is modified by execution of the executable module; and recomputing the hash value for the executable module.

3. The method of claim 1, wherein the mapping of the memory makes memory unwritable except for the one of the dynamic data area and the alternate memory area that is accessible.

4. The method of claim 1, wherein the start address and the end address for the dynamic data area coincide with page boundaries for the mapping of the memory.

5. The method of claim 1, wherein at least one of the start address and the end address for the dynamic data area do not coincide with page boundaries for the mapping of the memory and the mapping of the memory is of a page-aligned area that includes the dynamic data area.

6. The method of claim 1, wherein the start address and the end address for the dynamic data area are included in the executable module when the module is built and before the hash value is computed.

7. An article of manufacture comprising:
   a machine-accessible medium including data that, when accessed by a processor, cause the processor to perform operations comprising,
      loading an executable module having a dynamic data area that contains data that may be changed by execution of the executable module and a header that includes a start address and an end address for the dynamic data area,
      allocating an alternate memory area in a memory;
      making a copy of the dynamic data area in the alternate memory area,
      mapping the memory so that execution of the executable module modifies exactly one of the dynamic data area and the alternate memory area, and so that the one of the dynamic data area and the alternate memory area that is not modified by execution of the executable module is made inaccessible to the executable module, and
      computing a hash value for the executable module, the hash value including exactly one area selected from the group consisting of the dynamic data area and the alternate memory area.

8. The article of manufacture of claim 7, wherein the machine-accessible medium further includes data that, when accessed by the processor, cause the processor to perform further operations comprising:
   copying the one of the dynamic data area and the alternate memory area that is not modified by execution of the executable module to the one of the dynamic data area and the alternate memory area that is modified by execution of the executable module; and recomputing the hash value for the executable module.

9. The article of manufacture of claim 7, wherein the mapping of the memory makes memory unwritable except for the one of the dynamic data area and the alternate memory area that is accessible.

10. The article of manufacture of claim 7, wherein the start address and the end address for the dynamic data area coincide with page boundaries for the mapping of the memory.

11. The article of manufacture of claim 7, wherein at least one of the start address and the end address for the dynamic data area do not coincide with page boundaries for the mapping of the memory and the mapping of the memory is of a page-aligned area that includes the dynamic data area.

12. The article of manufacture of claim 7, wherein the start address and the end address for the dynamic data area are included in the executable module when the module is built and before the hash value is computed.

13. A system comprising:
   a processor that provides a machine state and can be configured such that the processor makes instructions that use the machine state privileged;
   a page mapped memory coupled to the processor, the memory selected from one of a synchronous dynamic random access memory (SDRAM) and an extended data out random access memory (EDO RAM), the memory including data that, when accessed by the processor, cause the processor to perform operations comprising,
  loading to the memory an executable module having a dynamic data area that contains data that may be changed by execution of the executable module and a header that includes a start address and an end address for the dynamic data area, allocating an alternate memory area in the memory;
  making a copy of the dynamic data area in the alternate memory area,
  mapping the memory pages so that execution of the executable module modifies exactly one area selected from the group consisting of the dynamic data area and the alternate memory area, and so that the one of the dynamic data area and the alternate memory area that is not modified by execution of the executable module is made inaccessible to the executable module, and
  computing a hash value for the executable module, the hash value including exactly one area selected from the group consisting of the dynamic data area and the alternate memory area.

14. The system of claim 13, wherein the memory further includes data that, when accessed by the processor, cause the processor to perform further operations comprising:
  copying the one of the dynamic data area and the alternate memory area that is not modified by execution of the executable module to the one of the dynamic data area and the alternate memory area that is modified by execution of the executable module; and recomputing the hash value for the executable module.

15. The system of claim 13, wherein the mapping of the memory makes memory unwritable except for the one of the dynamic data area and the alternate memory area that is accessible.

16. The system of claim 13, wherein the start address and the end address for the dynamic data area coincide with page boundaries for the mapping of the memory.

17. The system of claim 13, wherein at least one of the start address and the end address for the dynamic data area do not coincide with page boundaries for the mapping of the memory and the mapping of the memory is of a page-aligned area that includes the dynamic data area.

18. The system of claim 13, wherein the start address and the end address for the dynamic data area are included in the executable module when the module is built and before the hash value is computed.

19. A method comprising:
  loading an executable module having a dynamic data area that contains data that may be changed by execution of the executable module and a header that includes a start address and an end address for the dynamic data area;
  allocating an alternate memory area in a memory;
  making a copy of the dynamic data area in the alternate memory area;
  mapping the memory so that execution of the executable module modifies exactly one area selected from the group consisting of the dynamic data area and the alternate memory area;
  computing a hash value for the executable module, the hash value including exactly one of the dynamic data area and the alternate memory area;
  copying the one of the dynamic data area and the alternate memory area that is not modified by execution of the executable module to the one of the dynamic data area and the alternate memory area that is modified by execution of the executable module; and recomputing the hash value for the executable module.

20. The method of claim 19, wherein the mapping of the memory makes the one of the dynamic data area and the alternate memory area that is not modified by execution of the executable module inaccessible to the executable module.

21. The method of claim 19, wherein at least one of the start address and the end address for the dynamic data area do not coincide with page boundaries for the mapping of the memory and the mapping of the memory is of a page-aligned area that includes the dynamic data area.

22. The method of claim 19, wherein the start address and the end address for the dynamic data area are included in the executable module when the module is built and before the hash value is computed.

23. A method comprising:
  loading an executable module having a dynamic data area that contains data that may be changed by execution of the executable module and a header that includes a start address and an end address for the dynamic data area;
  allocating an alternate memory area in a memory;
  making a copy of the dynamic data area in the alternate memory area;
  mapping the memory so that execution of the executable module modifies exactly one area selected from the group consisting of the dynamic data area and the alternate memory area, wherein at least one of the start address and the end address for the dynamic data area do not coincide with page boundaries for the mapping of the memory and the mapping of the memory is of a page-aligned area that includes the dynamic data area; and
  computing a hash value for the executable module, the hash value including exactly one of the dynamic data area and the alternate memory area.

24. The method of claim 23, further comprising:
  copying the one of the dynamic data area and the alternate memory area that is not modified by execution of the executable module to the one of the dynamic data area and the alternate memory area that is modified by execution of the executable module; and recomputing the hash value for the executable module.

25. The method of claim 23, wherein the mapping of the memory makes the one of the dynamic data area and the alternate memory area that is not modified by execution of the executable module inaccessible to the executable module.

26. The method of claim 23, wherein the start address and the end address for the dynamic data area are included in the executable module when the module is built and before the hash value is computed.

27. A method comprising:
  loading an executable module having a dynamic data area that contains data that may be changed by execution of the executable module and a header that includes a start address and an end address for the dynamic data area;
  allocating an alternate memory area in a memory;
  making a copy of the dynamic data area in the alternate memory area;
  mapping the memory so that execution of the executable module modifies exactly one area selected from the group consisting of the dynamic data area and the alternate memory area; and
  computing a hash value for the executable module, the hash value including exactly one of the dynamic data area and the alternate memory area, wherein the start address and the end address for the dynamic data area are included in the executable module when the module is built and before the hash value is computed.

28. The method of claim 27, further comprising:
copying the one of the dynamic data area and the alternate memory area that is not modified by execution of the executable module to the one of the dynamic data area and the alternate memory area that is modified by execution of the executable module; and recomputing the hash value for the executable module.

29. The method of claim 27, wherein the mapping of the memory makes the one of the dynamic data area and the alternate memory area that is not modified by execution of the executable module inaccessible to the executable module.

30. The method of claim 27, wherein at least one of the start address and the end address for the dynamic data area do not coincide with page boundaries for the mapping of the memory and the mapping of the memory is of a page-aligned area that includes the dynamic data area.

* * * * *